(12) United States Patent
Miura

(10) Patent No.: US 6,987,891 B2
(45) Date of Patent: Jan. 17, 2006

(54) IMAGE DISPLAY DEVICE

(75) Inventor: Mikio Miura, Sagamihara (JP)

(73) Assignee: Ricoh Co., Ltd., Tokyo (JP)

( * ) Notice: Subject to any disclaimer, the term of this patent is extended or adjusted under 35 U.S.C. 154(b) by 703 days.

(21) Appl. No.: 09/956,228

(22) Filed: Sep. 19, 2001

(65) Prior Publication Data

US 2002/0034331 A1   Mar. 21, 2002

(30) Foreign Application Priority Data

Sep. 20, 2000   (JP) .......................................... 2000-285260

(51) Int. Cl.
G06K 9/36    (2006.01)
G06K 9/34    (2006.01)

(52) U.S. Cl. ...................................... 382/245; 382/173

(58) Field of Classification Search ................. 382/173, 382/181, 189, 194, 214, 218, 219, 232, 244, 382/245, 305; 341/59, 67; 345/560, 588; 358/523, 426.02, 426.13
See application file for complete search history.

(56) References Cited

U.S. PATENT DOCUMENTS

| | | | | |
|---|---|---|---|---|
| 4,185,303 A | * | 1/1980 | Mounts et al. | 382/238 |
| 4,630,124 A | * | 12/1986 | Endoh et al. | 358/426.02 |
| 5,552,832 A | * | 9/1996 | Astle | 375/240.24 |
| 6,014,095 A | * | 1/2000 | Yokoyama | 341/67 |
| 6,078,691 A | * | 6/2000 | Luttmer | 382/235 |
| 6,243,496 B1 | * | 6/2001 | Wilkinson | 382/245 |
| 6,298,165 B1 | * | 10/2001 | Howard | 382/245 |
| 6,404,359 B1 | * | 6/2002 | Sakai | 341/67 |
| 6,510,248 B1 | * | 1/2003 | Hsieh | 382/233 |

* cited by examiner

Primary Examiner—Andrew W. Johns
Assistant Examiner—Amir Alavi
(74) Attorney, Agent, or Firm—Knoble Yoshida & Dunleavy

(57) ABSTRACT

The image data is divided into groups of a predetermined fixed length, and the divided groups are simultaneously compared to predetermined patters for the entropy encoding to render a display image in the video memory unit. Because of the above processing, the encoding process is rapidly performed, and the processing speed is lower that that of prior art image processing techniques that do not involve data compression. Thus, the above described process is comparable in image rendering to prior art techniques that do not involve encoding and decoding. Because of the encoding compression, the video memory is efficiently utilized, and the video memory capacity is reduced.

2 Claims, 2 Drawing Sheets

IMAGE DISPLAY DEVICE

FIELD OF THE INVENTION

The current invention is generally related to an image display device, and more particularly related to image display devices such as cathode ray tubes (CRT) and liquid crystal displays (LCD).

BACKGROUND OF THE INVENTION

The video memory for storing image display data is generally stored in a bit map data format. Due to entropy redundancy, the memory space may be wasted. For example, contiguous black or white horizontal lines in the 640×480-dot VGA black-and-white display occupy memory that is equivalent of at least the number of lines times 640 bits.

Not limited to display, image data is generally large. If the image data is treated as is, a large amount of storage area is necessary. Because of the large storage, it is costly. To store the image data, the total volume of the image data is compressed by encoding. Furthermore, the compressed data is processed for efficiency. For example, the compression methods include MH or MMR encoding, JPEG for image and JBIG transformation encoding or arithmetic encoding techniques.

The above described prior art compression techniques are generally complex in encoding process. Since the above encoding techniques require determination and operation processes, the encoding and decoding processes tend to be long. For example, the arithmetic encoding technique such as QM-Coder is complex and slow in processing.

Furthermore, the above encoding techniques have developed in the area of image transmission such as facsimile transmission. Because of the above transmission format, the techniques have a tendency to treat a page as a unit. For this reason, when a portion of the stored image is to be encoded or is to be further edited before storing, it is necessary to encode a large amount of data beyond the portion in the image data and time and efforts have been wasted. The prior art encoding techniques are not generally suited for encoding or editing an arbitrary portion of the image data.

An improved encoding method for redundancy encodes by continuously calculating the run length. Even though a hardware support were available for the task, it would still take several to over ten clock cycles to output a single run length. When the above described prior art encoding techniques are applied to the display data for the video memory, it would take ten or thousand times longer time than the bit-map technique in which the display data is stored and edited in a bit-map format. Such a delay has been a reason for a slow or delayed image rendering process.

For the above reasons, an image processing device is desired to be improved for faster encoding and decoding processes so that the video memory is efficiently utilized.

SUMMARY OF THE INVENTION

In order to solve the above and other problems, according to a first aspect of the current invention, a device for displaying image data, including: a line buffer for dividing the image data into groups of a predetermined length; a pattern comparator connected to the line buffer for simultaneously comparing the groups of the image data to a predetermined set of data patterns, the pattern comparator generating comparison result signals; a run length determination unit connected to the pattern comparator for generating an encoding selection signals based upon the comparison result signals, the encoding selection signal indicating a repeated data length of one of the data patterns; a code conversion unit connected to the run length determination unit for converting a code of the image data into encoded image data based upon the encoding selection signal; and a video memory unit connected the code conversion unit for storing the encoded image data in a video display area.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
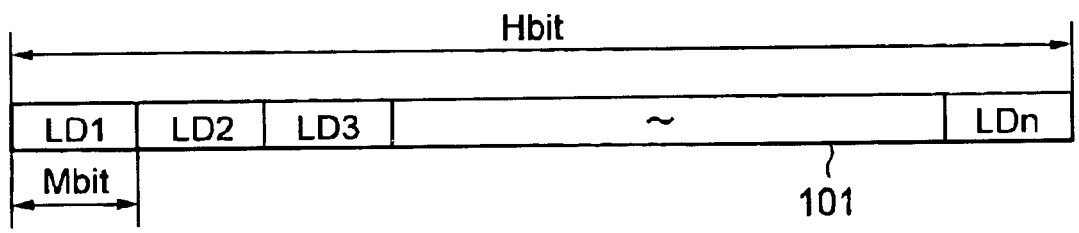
FIG. 1 is a diagram illustrating a concept of one preferred embodiment of the faster encoding process according to the current invention.

Referring now to the drawings, wherein like reference numerals designate corresponding structures throughout the views, and referring in particular to FIG. 1, a diagram illustrates a concept of one preferred embodiment of the faster encoding process according to the current invention. For example, data for the VGA display screen is designed for a screen size having 640 horizontal dots and 480 vertical dots. In general, assuming that H represents a number of horizontal dots, a single horizontal line contains H-bits of data. The preferred embodiment encodes the entire H-bit data from the single horizontal line at the same time. Rendered data from an external CPU by a software process is temporarily stored into a H-bit line buffer. The H-bit data is divided into groups LD1 through LDn of a minimally encodable unit of M-bit, and these groups of data are stored in comparators as shown in FIG. 2.

Figure 2:
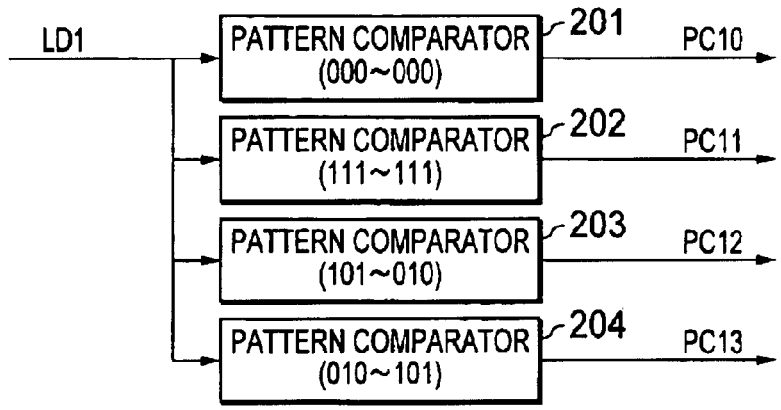
FIG. 2 is a block diagram illustrating four kinds of pattern comparators to be used with the current invention.

FIG. 2 is a block diagram illustrating four kinds of pattern comparators 201 through 204. The pattern comparator 201 compares data against M-bits of all zeroes. The pattern comparator 202 compares data against M-bits of all ones. The pattern comparator 203 compares data against M-bits of "10" repetitive patterns. The pattern comparator 204 compares data against M-bits of "01" repetitive patterns. The pattern comparators 201 through 204 respectively output signals PC10, PC11, PC12 and PC13, and each of the output signals PC10, PC11, PC12 and PC13 indicates one for a match while zero for a non-match. For each of other input signals LD2 through LDn, the same pattern matching unit as shown in FIG. 2 is connected, and each matching unit includes a set of four minimal encoding M-bit pattern blocks. For the input signals LD1 through LD4, the pattern comparator output signals include multiple sets of PC10 through PC13, PC20 through 23 and PCn 0 through PCn 3.

Figure 3:
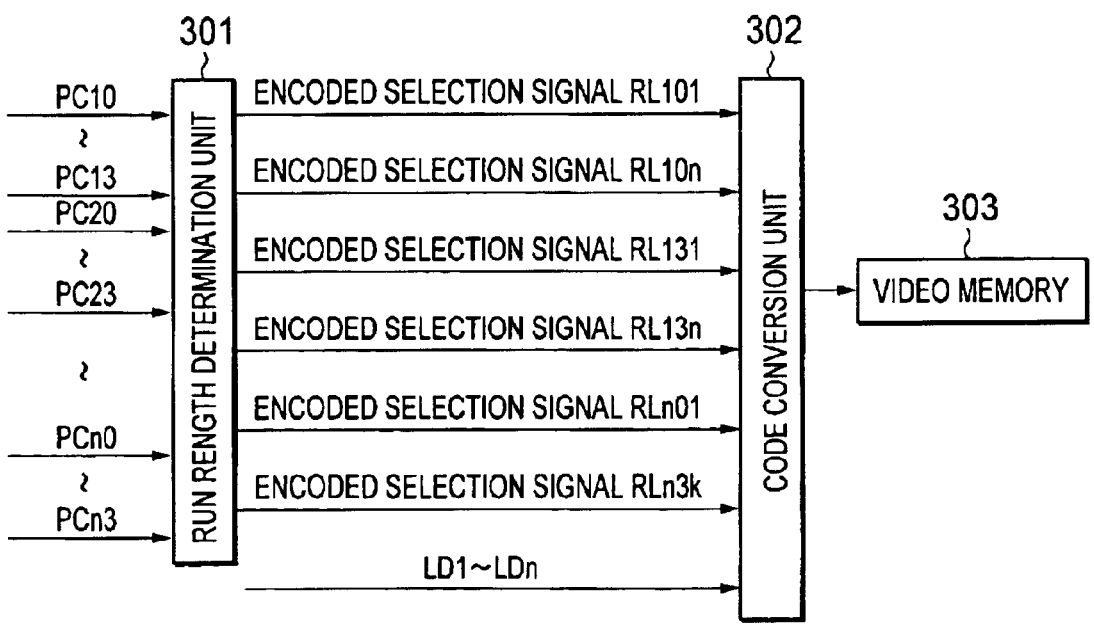
FIG. 3 is a diagram illustrating one preferred embodiment of the run length determination unit that is connected to the encoding unit and the video memory according to the current invention.

Now referring to FIG. 3, a diagram illustrates one preferred embodiment of the run length determination unit that is connected to the encoding unit and the video memory according to the current invention. The multiple sets of the pattern comparator output signals PC10 through PC13, PC20 through 23 and PCn 0 through PCn 3 are connected to the run length determination unit 301. The run length determination unit 301 determines a number of repetitive common pattern output signals among the pattern comparator output signals PC10 through PC13, PC20 through 23 and PCn 0 through PCn 3. To implement the above described determination unit, a number of AND gates is used. For example, if all of the zero patterns repeat in the input signal LD1, the run length determination unit 301 generates an encoding selection signal RL101 at one. If all of the zero patterns repeat in the input signals LD1 through LDn, the run length determination unit 301 generates the encoding selection signal RL10n at one and other encoding selection signals RL101 through RL10(n−1) all at zero. On the other hand, if all of the zero patterns do not repeat in the input signal LD1, the run length determination unit 301 generates all of the encoding selection signals RL101 through RL10n at zero. At the same time, the output signals for the input data LD2 are all zero and j blocks repeat, the run length determination unit 301 generates an encoding selection signal RL102 at one. Similarly, when all of the one patterns repeat, one of the encoding selection signals RL111 through RL11n and RLn11 through RLn1k. Furthermore, when all of the "10" patterns repeat, one of the encoding selection signals RL121 through RL12n and RLn21 through RLn2k. Lastly, when all of the "01" patterns repeat, one of the encoding selection signals RL131 through RL13n and RLn31 through RLn3k.

Still referring to FIG. 3, the above described output signals or the encoding selection signals are inputted into a code conversion unit 302. The code conversion unit 302 simultaneously receives the LD1 through LDn bit map data. For example, if the encode selection signal RL10j is one, the code conversion unit 302 stores the code corresponding to a run length as an initially encoded image for the line data in the video memory unit 303. If the output signals PC11 through PC13 from the pattern comparators 201 through 204 for the LD1 are all zeros or the LD1 data did not match with any of the patterns, the LD1 data is stored in a bit-map data format. However, data that distinguishes a code indicative of the run length is added. By the above process, the video memory 303 stores the run length code and the bit map data together. Since data is added to the bit map data to distinguish the run length code, the codes are distinguishable during decoding. The line data that has been encoded in the above described manner has various length when it is stored in the video memory unit 30. To facilitate the data read from the video memory unit 30, an end-of-line (EOL) code is added at the end of each line data. Furthermore, to decode the line data, the encoded line data is temporarily read into the buffer from the video memory unit 30 and perform via a decoding unit a process that is contrary to the encoding process to expand image data in the line buffer 101 as shown in FIG. 1.

In summary, the image data is divided into groups of a predetermined fixed length, and the divided groups are simultaneously compared to predetermined patters for the entropy encoding to render a display image in the video memory unit. Because of the above processing, the encoding process is rapidly performed, and the processing speed is lower that that of prior art image processing techniques that do not involve data compression. Thus, the above described process is comparable in image rendering to prior art techniques that do not involve encoding and decoding. Because of the encoding compression, the video memory is efficiently utilized, and the video memory capacity is reduced.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A device for displaying image data, comprising:

a line buffer for dividing the image data into groups of a predetermined length;

a pattern comparator connected to said line buffer for simultaneously comparing the groups of the image data to a predetermined set of data patterns, said pattern comparator generating comparison result signals;

a run length determination unit connected to said pattern comparator for generating an encoding selection signals based upon the comparison result signals, the encoding selection signal indicating a repeated data length of one of the data patterns;

a code conversion unit connected to said run length determination unit for converting a code of the image data into encoded image data based upon the encoding selection signal; and a video memory unit connected said code conversion unit for storing the encoded image data in a video display area.

2. The device for displaying image data according to claim 1 wherein the predetermined set of the data patterns include an all zero pattern, an all one pattern, a repeated one zero pattern, and a repeated zero one pattern.

* * * * *